United States Patent [19]

Rees

[11] 4,120,600
[45] Oct. 17, 1978

[54] CORNER BRACKET

[76] Inventor: Gordon H. Rees, 1650 Fillmore Ave., Buffalo, N.Y. 14211

[21] Appl. No.: 676,284

[22] Filed: Apr. 12, 1976

[51] Int. Cl.$^2$ .............................................. F16B 7/00
[52] U.S. Cl. ..................................... 403/231; 46/29; 403/406
[58] Field of Search ....................... 403/231, 217–219, 403/403, 405, 406, 169–178, 230, 401, 402; 52/753 C, 753 D, 752, 751, 280; 217/65, 69; 46/28, 25, 29, 30, 31

[56] References Cited

U.S. PATENT DOCUMENTS

| 493,882 | 3/1893 | White | 403/231 |
|---|---|---|---|
| 633,279 | 9/1899 | Baugh | 217/69 |
| 1,008,483 | 11/1911 | McMillin | 403/172 |
| 1,141,210 | 6/1915 | Pirson | 403/231 |
| 1,245,456 | 11/1917 | Goedeke | 217/69 |
| 1,506,451 | 8/1924 | Schleuter | 52/753 D UX |
| 1,607,711 | 11/1926 | Walker | 217/69 |
| 1,669,625 | 5/1928 | Oppenheim | 217/69 |
| 1,807,186 | 5/1931 | Warner | 403/172 |
| 1,926,268 | 9/1933 | Dummer | 217/65 X |
| 2,590,159 | 3/1952 | Davis | 52/753 D X |
| 3,062,570 | 11/1962 | Schwartz | 403/172 |
| 3,102,616 | 9/1963 | Simpkins | 403/176 |
| 3,305,252 | 2/1967 | Jureit | 403/170 |
| 3,912,407 | 10/1975 | Heininger | 403/231 X |
| 3,914,062 | 10/1975 | Heininger | 403/231 |

FOREIGN PATENT DOCUMENTS

| 74,963 | 1/1961 | France | 403/176 |
|---|---|---|---|
| 1,286,872 | 2/1962 | France | 403/176 |

Primary Examiner—Wayne L. Shedd

[57] ABSTRACT

A corner construction bracket for the assembly of a three dimensional framework comprising end and side and vertical leg members of standard dimensional lumber e.g., 2×4s etc., said bracket comprising a complete folded corner, welded by a lip to the mating plane surface. Each plane surface containing a projection for the positioning and retention of said members, and strategically punched holes for appropriate fasteners, e.g. screws etc.

7 Claims, 4 Drawing Figures

CORNER BRACKET

BACKGROUND OF THE INVENTION

A means of quickly and economically constructing a work bench or table or any cubic or rectangular structure of any desired size and of readily obtainable material was required. Methods used in the prior arts require expensive, accurate and time-consuming joinery or multiple gusset plates or struts, all requiring expensive and time consuming jig fixtures for accurate assembly and alignment. Hence the conception and developement of this invention.

SUMMARY OF INVENTION

This device is fabricated from a one piece stamped and punched blank and bent into the form of a perfect geometrical figure; e.g., a cube; and specifically a section disecting one corner of said cube, to the two diagonally opposite corners, thus forming a complete corner. This shape conforms to the kinetic laws of direct force or motion; which law states that if all direct force or motion is totally constrained in all six possible directions, perfect immobility or rigidity obtains. This device conforms to this concept by virtue of the three right angle folds, which form a perfectly square corner, and in practice, this rigidity is limited only by the strength of the material from which it is made.

BRIEF DISCRIPTION OF DRAWINGS

PREFERRED EMBOBIMENTS OF THIS INVENTION

Figure 1:
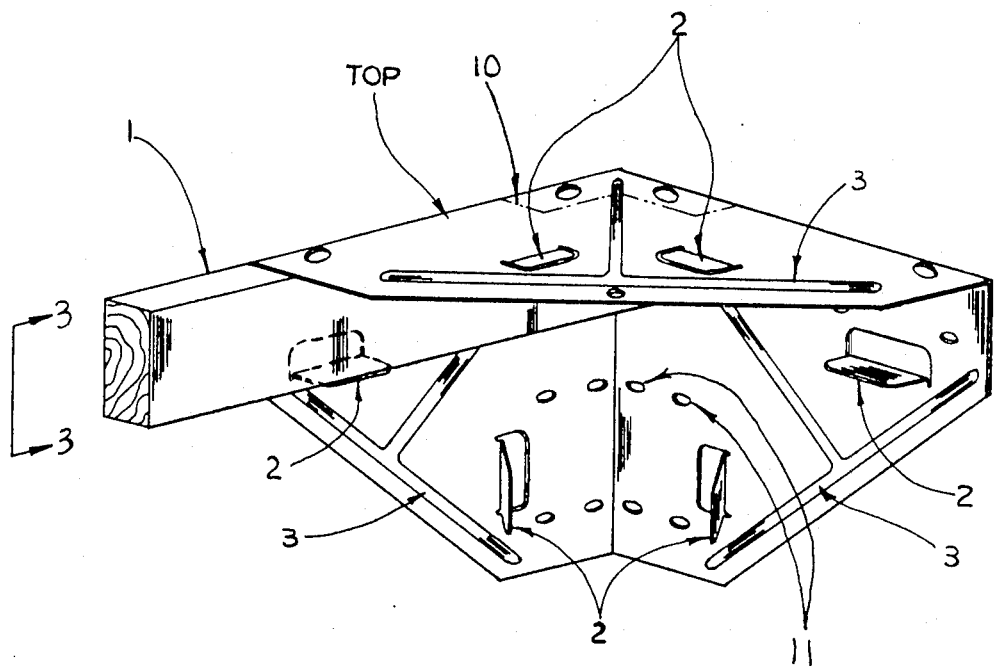
FIG. 1 is an inside view looking straight into the corner of the completed bracket, showing all the features contained in this design, and with one member installed.
Figure 2:
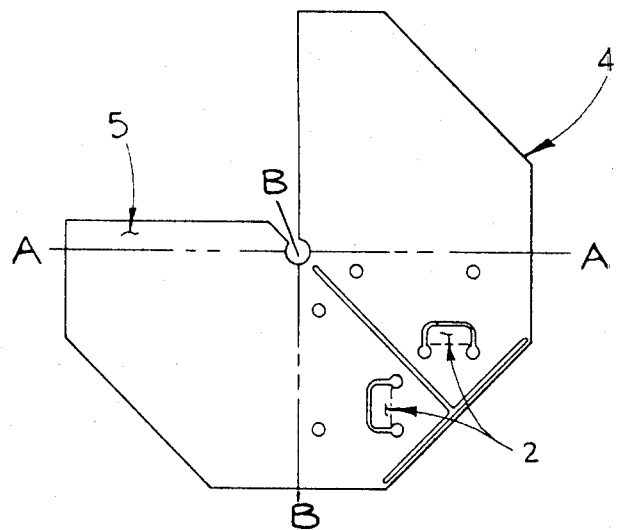
FIG. 2 is a view looking vertically down on the stamped and punched blank; showing the removed sector and lip for welding, and with one member installed.
Figure 3:
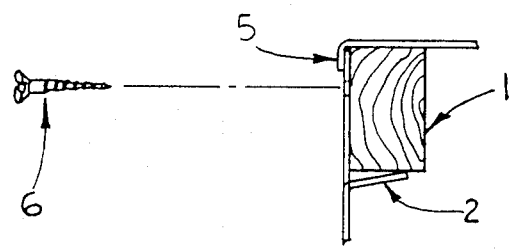
FIG. 3 shows an inside end-on view into the horizontal corner with a member installed and illustrating the function of the aligning and retaining projection.
Figure 4:
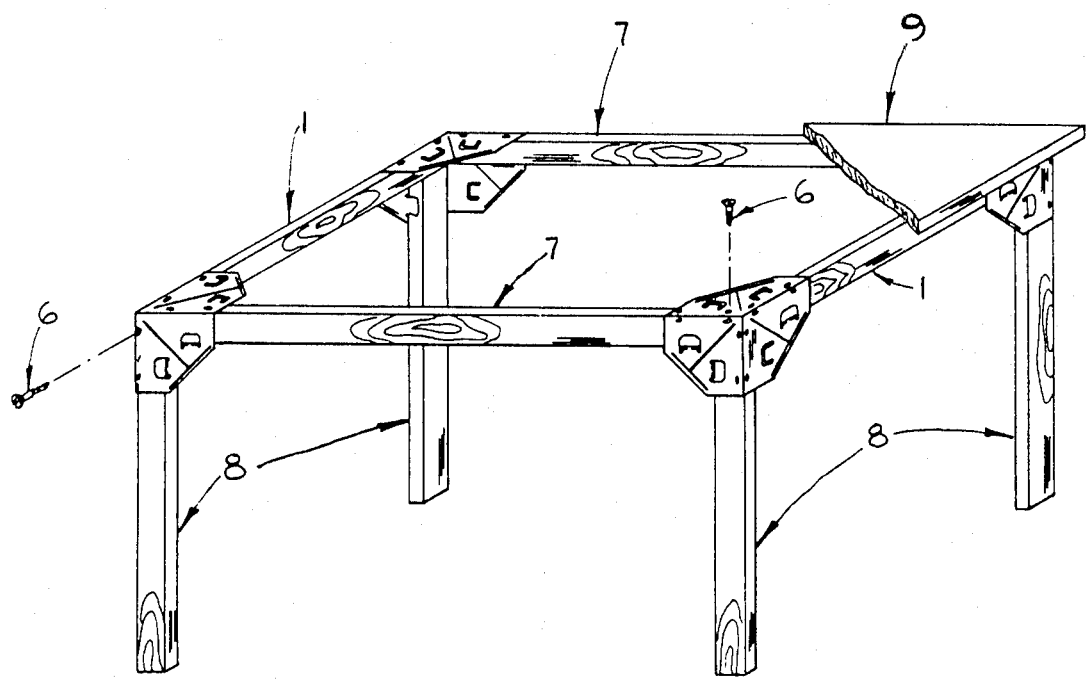
FIG. 4 is an over all view of a completed structure utilizing this invention.

FIG. 4 illustrates one of many practical and functional uses of the present invention. In this case, four brackets (FIG. 1) are required to construct this work bench or table using cheap and easily obtained short ends or cut-offs of standard lumber e.g. 2×4s, one for each leg. Members 8 are inserted vertically in each bracket (FIG. 1) whence each projection 2 guides the member 8 flat against the panel of the bracket (FIG. 1) and also applies pressure to retain member 8 in place; a front member 7 is then inserted into left horizontal corner of bracket and left leg assembly where again projection 2 guides and retains said member. The remaining end of front member 7 is inserted into horizontal corner of the right bracket and leg assembly (FIGS. 1 and 8). The right-hand end member 1 is then inserted into the remaining corner of the right bracket and leg assembly. Continuing around to the left-hand end, member 1 is finally inserted into the remaining corner of the first bracket and leg assembly resulting in a free-standing framework. The whole assembly is then placed on a firm level surface and the various members are snugged up tight into all corners and flush against the side panels of the brackets (FIG. 1). Pilot holes are then drilled into the various members through holes 11 and then screws 6 or other appropriate fasteners are inserted and driven home; the assembly now being complete. A top 9 of any suitable material completes the structure. All members 1 & 7 & 8 are pre-cut to the correct size for the desired dimentions. The blank forming FIG. 1 could best be stamped, punched and creased at one time then folded across line A—A of FIG. 2 and then across line B—B of FIG. 2 forming the three right angles of bracket FIG. 1. The lip 5 in FIG. 2 is then spot-welded or otherwise fastened, externally to the mating panel as in FIG. 3.

I claim:

1. A corner construction bracket for three dimensional frames comprising:
   (a) a unitary member having three mutually perpendicularly related planar sides, said member being relatively strong and stiff and being formed of a relatively rigid, yet at least somewhat resilient material, adjacent faces of said sides forming an interior surface,
   (b) each said side being rigidly affixed edgewise to each of the other two sides,
   (c) means on each said side other than separate fastening means for guiding an end portion of at least one frame element of a selected size into proper position in said bracket, said means also both biasing said end portion against one adjacent side and holding it substantially parallel to said side simultaneously
   (d) each said side also including suitably positioned holes for receiving fasteners for fastening said bracket to said frame elements,
   (e) said frame element holding means including an inwardly extending projection for engaging an outwardly facing side of the end portion of an inserted frame element, said projection having an attached edge and a free edge, said projection being relatively elongated and positioned in spaced, parallel relation to said one adjacent side, said spacing being substantially equal to one dimension of said selected size,
   (f) said projection spacing being at least somewhat adjustable by bending said projection to accommodate minor variations in the size of the frame elements from said selected size, whereby three frame elements may be inserted into said bracket and held in mutually perpendicular relation pending the insertion of separate fasteners.

2. The corner bracket of claim 1, wherein said projections are partially scored through along their attached edges, thereby facilitating adjustment of said projections into proper contact with said inserted end portions of frame elements.

3. The corner bracket of claim 1, wherein the scored edges of said projections also form a means facilitating frangible removal of said projections.

4. The corner bracket of claim 1, wherein the said projections have rounded corners, thereby facilitating entry of said frame elements.

5. The corner bracket of claim 1, wherein rigidifying deformations are formed in each of said planar sides.

6. The corner bracket of claim 1, wherein said projections extend substantially perpendicularly inward from said sides.

7. The corner bracket of claim 1, wherein said bracket is a sheet metal stamping.

* * * * *